United States Patent

Markiewicz et al.

[11] Patent Number: 5,866,845
[45] Date of Patent: Feb. 2, 1999

[54] ELECTRICAL BOX

[75] Inventors: John B. Markiewicz, Mentor; Charles H. Riedy, Lakewood; David P. Marshall, Chagrin Falls; Peter D. Sadosky, Parma, all of Ohio

[73] Assignee: The Lamson & Sessions Co., Cleveland, Ohio

[21] Appl. No.: 867,059

[22] Filed: Jun. 2, 1997

(Under 37 CFR 1.47)

[51] Int. Cl.$^6$ .................................................... H05K 5/00
[52] U.S. Cl. .............................................. 174/57; 174/66
[58] Field of Search ................................. 174/66, 67, 50, 174/53, 57, 17 CT; 220/241, 242, 3.8, 3.92, 3.94, 4.02

[56] References Cited

U.S. PATENT DOCUMENTS

| | | |
|---|---|---|
| 2,212,145 | 8/1940 | Benander ............................... 174/66 X |
| 2,929,529 | 3/1960 | Hudson . |
| 3,029,964 | 4/1962 | Hudson et al. . |
| 3,222,834 | 12/1965 | Taft . |
| 3,530,230 | 9/1970 | Cormier et al. ........................... 174/66 |
| 3,701,837 | 10/1972 | Fork . |
| 3,773,969 | 11/1973 | Geisel . |
| 3,792,414 | 2/1974 | Smith . |
| 3,956,573 | 5/1976 | Myers et al. . |
| 3,966,073 | 6/1976 | Geisel ................................... 174/67 X |
| 4,012,874 | 3/1977 | Brogan et al. . |
| 4,109,095 | 8/1978 | Kling et al. ............................... 174/67 |
| 4,165,443 | 8/1979 | Figart et al. ............................... 174/53 |
| 4,197,959 | 4/1980 | Kramer et al. ......................... 220/3.8 X |
| 4,289,921 | 9/1981 | Gartner et al. . |
| 4,338,484 | 7/1982 | Littrell . |
| 4,365,108 | 12/1982 | Bright ....................................... 174/50 |
| 4,428,492 | 1/1984 | Jorgensen ............................... 174/53 X |
| 4,443,654 | 4/1984 | Flachbarth et al. . |
| 4,484,021 | 11/1984 | Schaefer et al. ....................... 174/67 X |
| 4,613,728 | 9/1986 | Lathrop . |
| 4,733,330 | 3/1988 | Tanaka et al. . |
| 4,758,687 | 7/1988 | Lathrop . |
| 4,803,307 | 2/1989 | Shotey . |
| 4,810,833 | 3/1989 | Meyers . |
| 4,872,575 | 10/1989 | Kobilan . |
| 4,874,904 | 10/1989 | DeSanti . |
| 4,874,906 | 10/1989 | Shotey . |
| 4,952,756 | 8/1990 | Meyers . |
| 4,988,832 | 1/1991 | Shotey . |
| 4,998,635 | 3/1991 | Vink et al. . |
| 5,041,698 | 8/1991 | Takagi et al. . |
| 5,073,681 | 12/1991 | Hubben et al. . |
| 5,098,046 | 3/1992 | Webb . |
| 5,148,348 | 9/1992 | White . |
| 5,162,612 | 11/1992 | Naka et al. . |
| 5,171,939 | 12/1992 | Shotey . |
| 5,189,259 | 2/1993 | Carson et al. . |
| 5,224,673 | 7/1993 | Webb . |
| 5,285,009 | 2/1994 | Bowman et al. . |

(List continued on next page.)

FOREIGN PATENT DOCUMENTS

| | | | |
|---|---|---|---|
| 465351 | 11/1927 | Germany ........................... 220/241 X |
| 698446 | 4/1994 | Japan ..................................... 174/66 X |
| 615013 | 12/1948 | United Kingdom ................. 174/67 X |
| 2241389 | 8/1991 | United Kingdom ................. 174/67 X |
| 9424742 | 10/1994 | WIPO .................................. 174/66 X |

*Primary Examiner*—Dean A. Reichard
*Attorney, Agent, or Firm*—Jones, Day, Reavis & Pogue

[57] ABSTRACT

An electrical box is provided in which a box enclosure is provided that includes a base, sides and at least one yoke for receiving an electrical device. The box enclosure can be formed of discrete components which can be assembled to form a single or multiple-gang box. A collar is provided as an interface between the box enclosure and the mounting surface. The collar hingeably retains a cover for optionally covering the electrical device. The cover in turn hingeably retains a cord door for admitting an electrical cord and other such cables. The cover and cord door each have respective gaskets which provide a fluid-tight seal to protect the electrical device. The cover can be manufactured for a single-gang or a multiple-gang electrical box.

23 Claims, 6 Drawing Sheets

U.S. PATENT DOCUMENTS

| | | |
|---|---|---|
| 5,288,041 | 2/1994 | Webb . |
| 5,306,178 | 4/1994 | Huang . |
| 5,326,060 | 7/1994 | Chubb et al. . |
| 5,423,499 | 6/1995 | Webb . |
| 5,449,860 | 9/1995 | Buckshaw et al. . |
| 5,455,388 | 10/1995 | Pratt . |
| 5,457,286 | 10/1995 | Flasz . |
| 5,467,565 | 11/1995 | Bowman et al. . |
| 5,477,010 | 12/1995 | Buckshaw et al. . |
| 5,533,636 | 7/1996 | Reiker ................................. 174/66 X |
| 5,673,522 | 10/1997 | Schilham ............................. 174/50 X |

ELECTRICAL BOX

The present invention pertains to the field of electrical boxes of the type used to receive switches, outlets and the like. The present invention has particular applicability to, but is not limited to, floor boxes which are set into a concrete or other type of floor.

Electrical boxes are insulating receptacles for retaining electrical power devices within walls, floors and ceilings of buildings in order to provide a safe electrical housing. Most common electrical boxes are made to standard sizes and shapes, formed as single or multiple-gang boxes for respectively housing one or more electrical devices. Electrical boxes are covered with a plate which further encloses and insulates the electrical device, while also providing a finished decorative appearance. Such plates are made in a variety of standard sizes to suit a variety of purposes. For example, a floor box plate may have a tapered edge if used on a carpeted floor. Another type may have a flat edge for receiving the abutting edge of tile if used on a tile floor. The various standard types of these components require separate manufacture, thus requiring multiple toolings and inventory maintenance for similar components. Such standard components can also create problems for consumer and field personnel, who may not find the standard components suited to their particular needs.

Floor box plates include a cover for protecting the electrical device from damage due to traffic, etc. Covers often include cord doors which admit an appliance cord, allowing the cover to be closed while an outlet is in use. However, while protecting against mechanical damage, a typical cover and cord door arrangement does not protect against water, e.g. scrub water, which can flow into the electrical box and short out the device.

SUMMARY OF THE INVENTION

In view of the difficulties and drawbacks associated with previous electrical box components, it would be advantageous to provide electrical box components which offer improved versatility and efficiency.

Therefore, there is a need for an electrical box having a cover which can be sealed against water flow.

There is also a need for an electrical box having a cover which can be adapted to a variety of decorator needs.

There is also a need for an electrical box which can be adapted to make a single or multiple gang box.

There is also a need for an electrical box in which the position of the yoke within the box can be adjusted.

These needs and others are realized by the present invention in which a box enclosure is provided that includes a base, sides and at least one yoke for receiving an electrical device. The box enclosure can be formed of discrete components which can be assembled to form a single or multiple-gang box. A collar is provided as an interface between the box enclosure and the mounting surface. The collar hingeably retains a cover for optionally covering the electrical device. The cover in turn hingeably retains a cord door for admitting an electrical cord and other such cords and cables. The cover and cord door each have respective gaskets which provide a fluid-tight seal to protect the electrical device against water damage. The cover can be manufactured for a single-gang or a multiple-gang electrical box.

As will be appreciated, the invention is capable of other and different embodiments, and its several details are capable of modifications in various respect, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
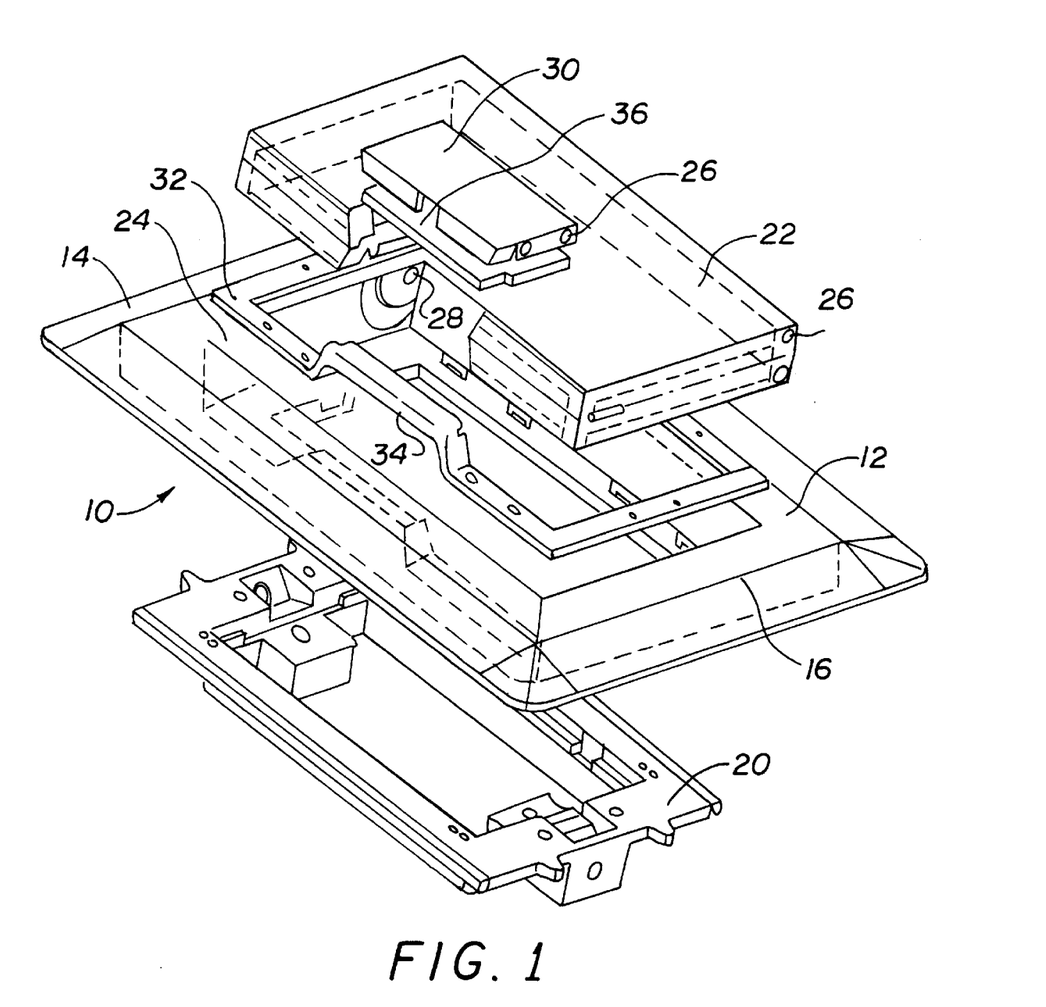
FIG. 1 is an exploded view showing the single-gang cover assembly according to the present invention.
Figure 2:
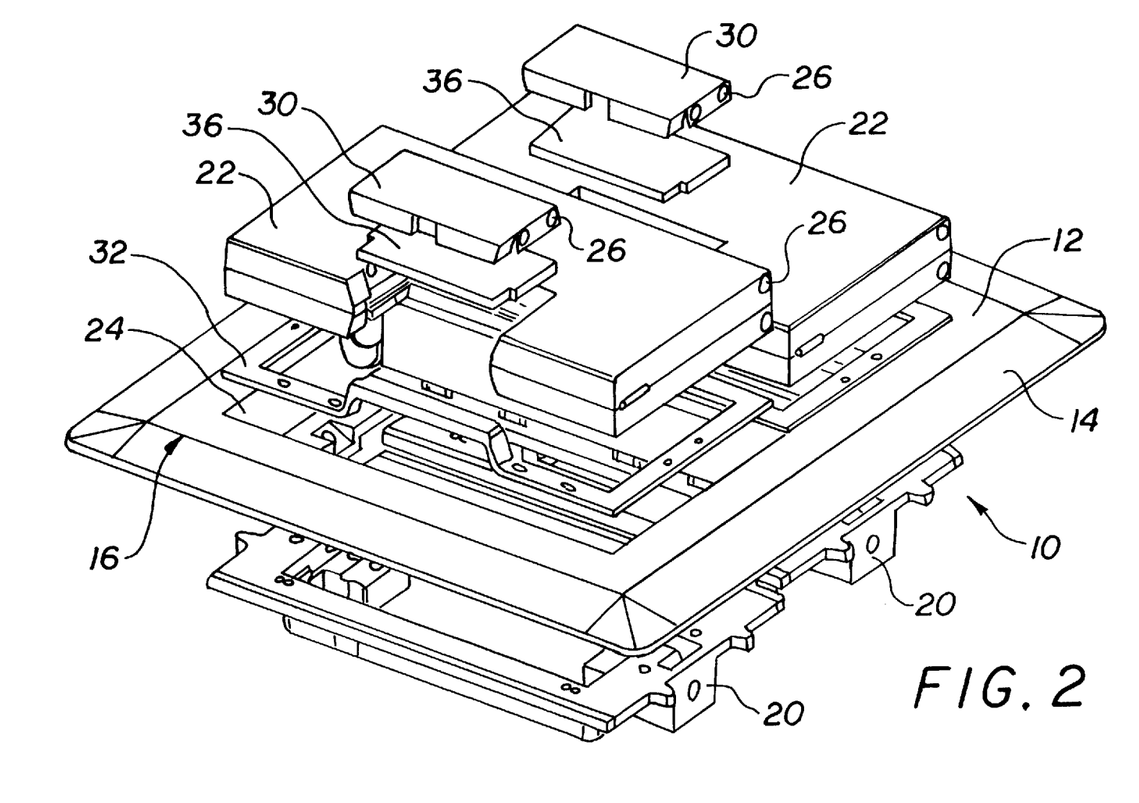
FIG. 2 is an exploded view showing the double-gang cover assembly according to the present invention.
Figure 3:
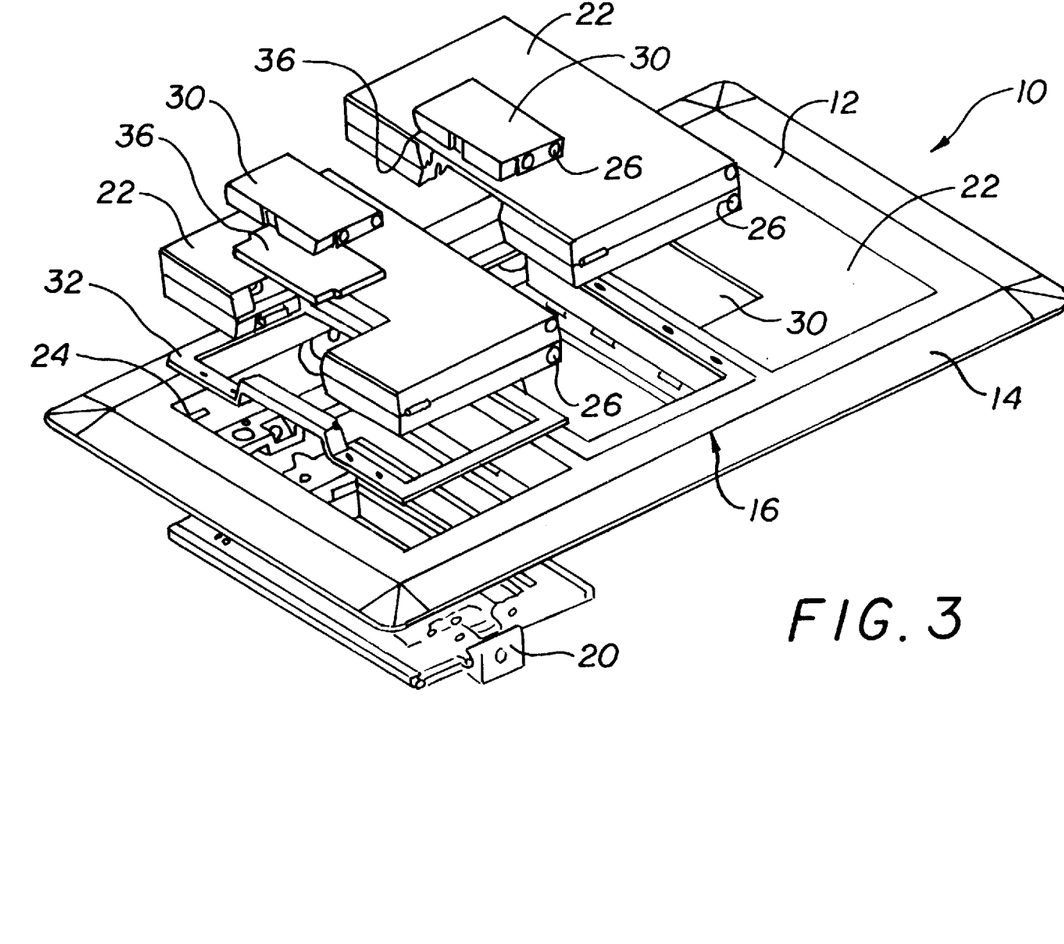
FIG. 3 is an exploded view showing the triple-gang cover assembly according to the present invention.

The drawings are now referred to which are for purposes of illustrating only the preferred embodiment of the present invention and not for purposes of limiting the same. FIG. 1 shows a single-gang cover assembly 10 as according to the present invention. FIGS. 2 and 3 show respective double- and triple-gang cover assemblies 10, where like reference numbers refer to like elements.

The cover assembly 10 includes a collar 12 for providing a decorative and functional interface between the electrical box and the mounting surface, i.e. the wall, floor, ceiling or other surface. In the preferred embodiment, the collar 12 is used to cover a floor box. The collar 12 includes a removable carpet flange 14 having a tapered edge for cooperating with a carpeted surface. The carpet flange 14 is joined to the main collar section at a frangible section along a score line 16. An end-user can remove the carpet flange 14 by cutting or snapping along the score line 16. Upon removal of the carpet flange 14, the collar 12 presents a flat edge (shown in phantom) which cooperates with abutting edges of floor tile. Thus, the present collar can be used with both carpet and tile floors, avoiding the need for separate collars, thereby reducing manufacturing and inventory maintenance expenses.

A yoke 20 is used for retaining the electrical device, which can be a power outlet, a switch or the like. The yoke 20 is connected to the underside of the collar 12 using screws (not shown) in the conventional manner. The electrical device is optionally covered by a cover 22 which resides in the collar 12. The collar 12 includes a plurality of interior side walls 24 which define a collar aperture for admitting access to the electrical device.

The cover 22 substantially resides within the collar aperture and is hingeably connected to the collar 12 using a plurality of projections 26, preferably formed on the cover 22, which cooperate with dimples 28, preferably formed on the respective interior side walls 24. However, the dimples 28 and projections 26 can each also be formed on the respective other components without departing from the invention.

The cover 22 includes a cover aperture, hingeably connected to a cord door 30, which optionally admits a cable such as an electrical cord of an appliance, a data or communication cable, or electrical connection with the electrical device. The cord door 30 substantially resides within the cover aperture and is also hingeably connected to the cover 22 with an arrangement of dimples 28 and projections 26.

When the cover 22 is closed, the collar 12 is sealed against the cover 22 with a collar gasket 32, which resides within the collar aperture, thereby providing a fluid seal between the collar 12 and the cover 22. One of the interior side walls 24 includes a ramped portion (shown in phantom) which extends up to the centerline of the cover toward the cord door 30. The collar gasket 32 includes an extending portion 34 having a shape complementary to the ramped portion, so as to mate with the ramped portion. A cord door gasket 36 is provided which substantially provides a fluid seal between the cover 22 and cord door 30. The cord door gasket 36 also makes sealing contact with the collar gasket 32 so as to provide a substantially fluid-tight seal between the cover and cord door. The gaskets prevent scrub water and other liquid from entering the electrical box, thus improving safety by reducing the chances of electrical shorts.

The present cover 22 provides the end-user with a number of decorator options. The cover 22 is reversible, and has one side with a finished surface that complements the appearance of the collar 12. The other side includes a recessed surface (shown in hidden lines) which is sized so as to receive carpet or tile, thus blending in with the floor. The projections 26 are interchangeable, and so the cover 22 can be oriented with either side facing outwardly, thus adding further to the versatility of the present invention.

Figure 4A:
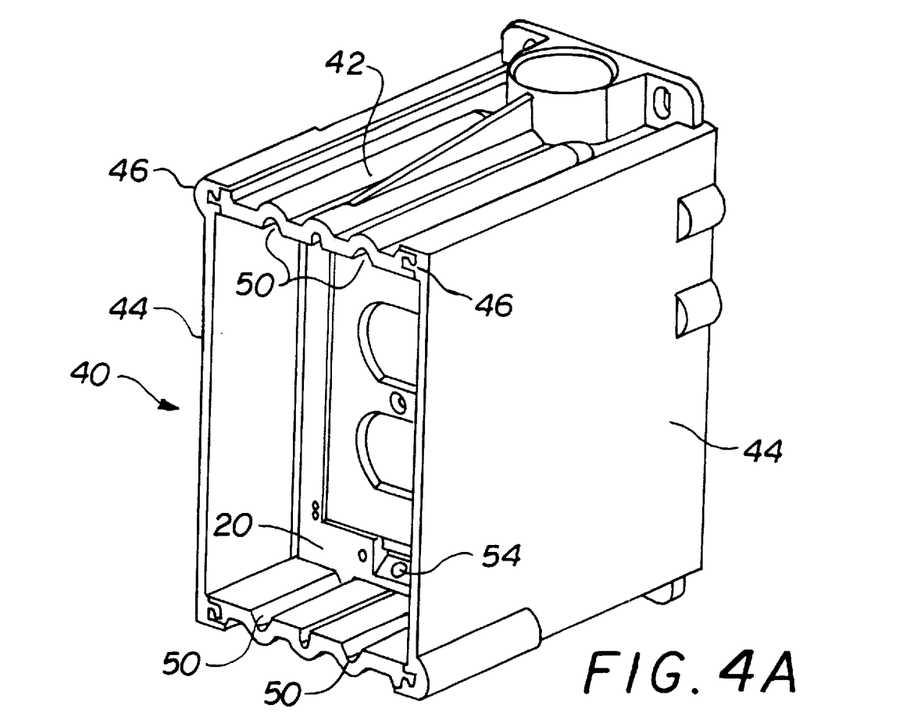
FIGS. 4A and 4B are respective oblique and exploded views showing the single-gang box enclosure according to the present invention.
Figure 4B:
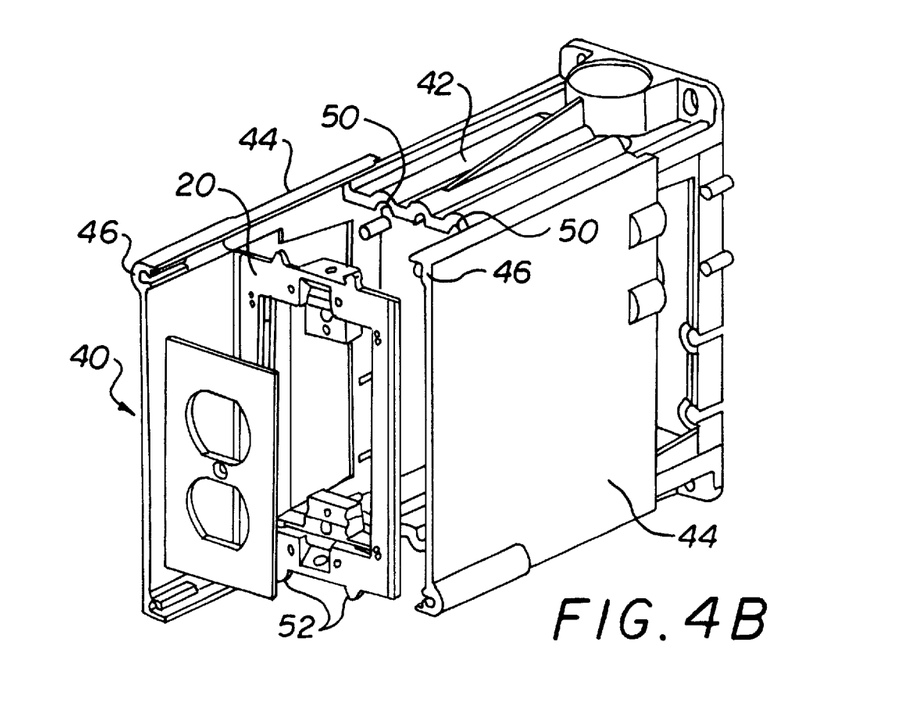
Figure 5A:
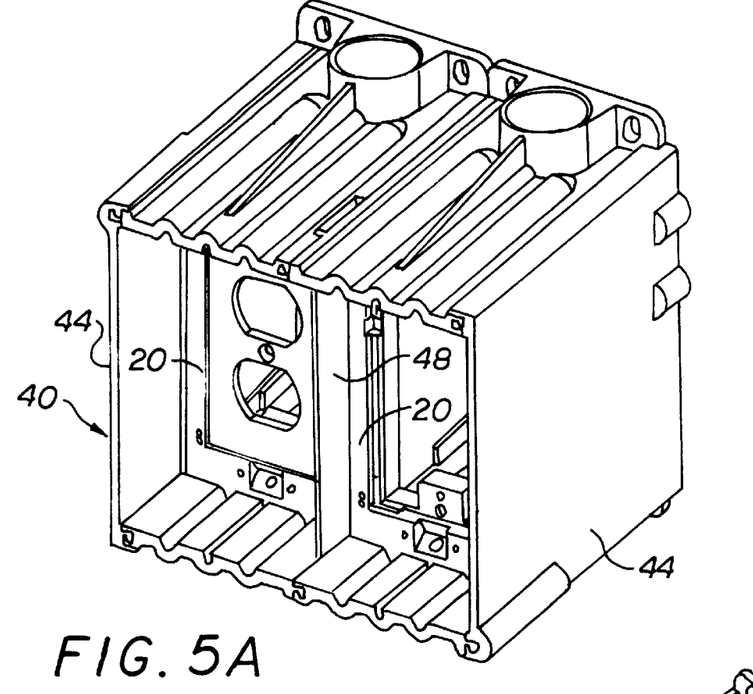
FIGS. 5A and 5B are respective oblique and exploded views showing the double-gang box enclosure according to the present invention.
Figure 5B:
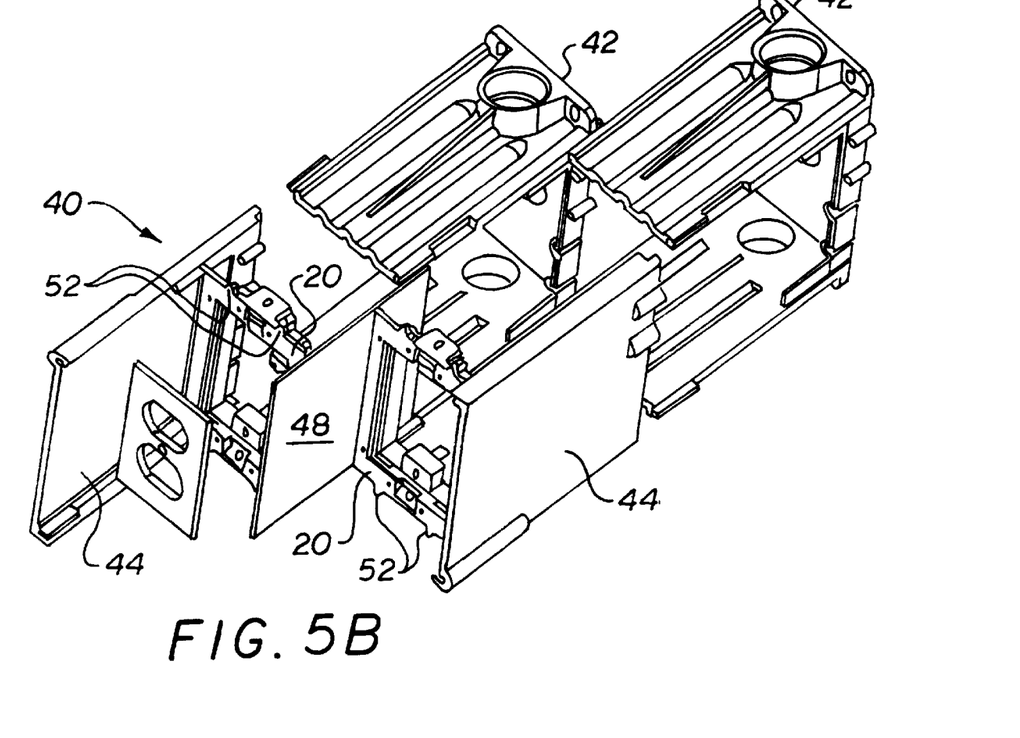
Figure 6A:
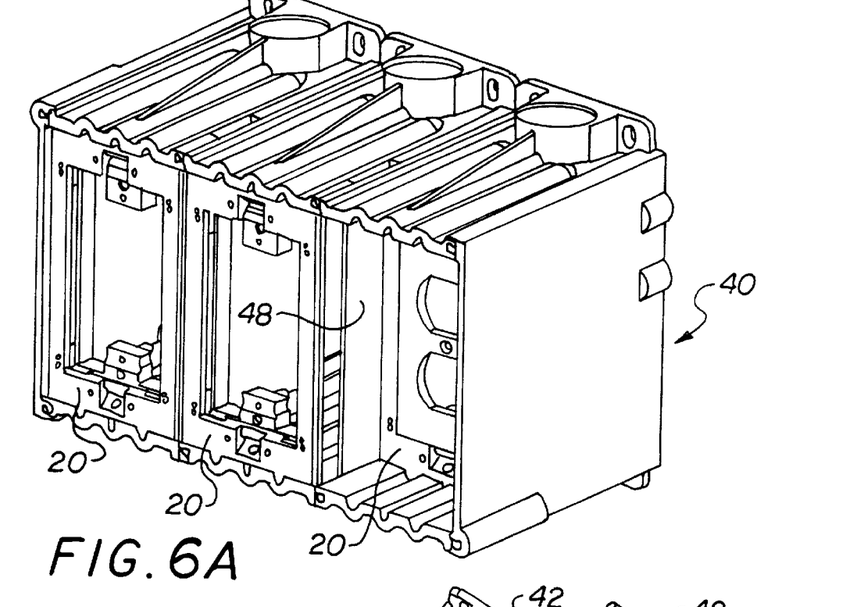
FIGS. 6A and 6B are respective oblique and exploded views showing the triple-gang box enclosure according to the present invention.
Figure 6B:
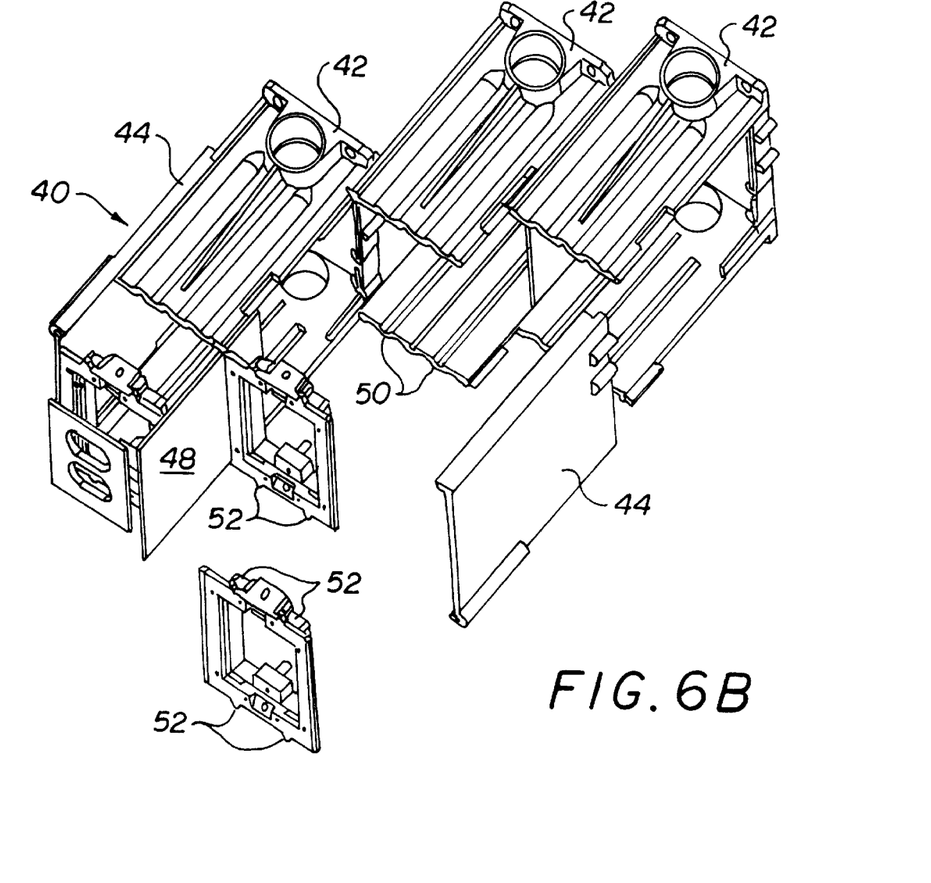

Turning now to the remaining figures, FIGS. 4A & 4B show a single-gang box enclosure 40 in accordance with the present invention. FIGS. 5A, 5B and 6A, 6B respectively show double- and triple-gang box enclosures 40, where like reference numbers refer to like elements.

The box enclosure 40 includes a base 42 and sides 44 for providing an enclosed unit. In the preferred embodiment, the base 42 and sides 44 are formed of discrete components having interlocking structures which permit them to be joined together.

For example, mating tongue and groove structures can be provided along the respective conjoining edges to permit securement. As can be seen from the figures, a plurality of bases 42 can be slid together to provide a multiple-gang box, relying on the same components. Divider members 48 can be provided to isolate the respective electrical devices in a multiple-gang box. In this way, a few standard pieces can be assembled into a variety of different electrical boxes, thereby further reducing manufacturing and inventory-maintenance expenses, and adding further versatility.

The yoke 20 is retained within the box enclosure 40 by two (2) pair of guides 50, which are preferably track-like structures formed along the base 42. The guides 50 cooperate with mating structures 52 formed on the yoke 20. The yoke 20 slides back and forth along the guides 50 so as to vary the yoke position within the box enclosure 40. The mating structures 52 preferably include a hole 54 for receiving a screw. Upon insertion, the screw penetrates into the base 42, so as to secure the yoke 20 to the box enclosure 40. In this way, the depth at which an electrical device such as an outlet is to be mounted can be adjusted by the end user, adding further to the versatility of the invention.

As described hereinabove, the present invention provides an electrical box with improved versatility, safety and efficiency, offering clear advantages over prevailing electrical boxes. However, it will be appreciated that various changes in the details, materials and arrangements of parts which have been herein described and illustrated in order to explain the nature of the invention may be made by those skilled in the art within the principle and scope of the invention as expressed in the appended claims.

we claim:

1. An electrical box for retaining an electrical device, said box comprising:

a box enclosure including a base, sides and at least one yoke for receiving the electrical device, wherein the box enclosure is retained on a mounting surface, and wherein the base includes guides which cooperate with mating structures on the at least one yoke so as to vary the position of the yoke within the box enclosure, and wherein each of the mating structures include a slot for receiving a screw, wherein each screw penetrates the base so as to secure the yoke to the box enclosure;

a collar connected to the box enclosure for providing an interface between the box enclosure and the mounting surface, wherein the collar includes a plurality of interior side walls which define at least one collar aperture for admitting access to the electrical device;

at least one cover, hingeably connected to the collar, for optionally covering the electrical device, wherein the cover substantially resides within the at least one collar aperture, and wherein the cover includes a cord door aperture;

at least one cord door, hingeably connected to the cover, for optionally admitting an electrical cable in electrical connection with the electrical device, wherein the cord door substantially resides within the cord door aperture;

a cord door gasket for substantially providing a fluid seal between the cover and the cord door;

a collar gasket which resides within the at least one collar aperture for providing a fluid seal between the collar and the cover, wherein at least one of the plurality of interior side walls of the collar includes a ramped portion which extends toward the cord door, wherein the collar gasket includes an extending portion which mates with the ramped portion to seal against the cord door, wherein the collar gasket and cord door gasket cooperate to provide a substantially fluid-tight seal around the cover and the cord door.

2. The electrical box of claim 1 wherein the cover is reversible, and has a finished surface and a recessed surface for receiving carpet and tile.

3. The electrical box of claim 1 wherein the cover and cord door are respectively hingeably connected with a plurality of projections which cooperate with dimples, one of said plurality of projections and dimples being formed on one of said cover and cord door and the respective other of said plurality of projections and dimples being formed on the respective other of said cover and cord door.

4. The electrical box of claim 1 wherein the collar includes a removable carpet flange having a tapered edge for cooperating with a carpeted surface, wherein upon removal of the carpet flange, the collar presents a flat edge which cooperates with abutting edges of tile.

5. The electrical box of claim 1 wherein the box enclosure is a multiple-gang box for receiving a number of yokes, wherein the collar includes an equal number of collar apertures which receive an equal number of covers having cord doors.

6. The electrical box of claim 1 wherein the base and sides are discrete components having cooperating interlocking structures and wherein a plurality of bases and sides can be assembled to form a multiple-gang box.

7. An electrical box for retaining an electrical device, said box comprising:
a box enclosure, retained on a mounting surface, including at least one yoke for receiving the electrical device, wherein the box enclosure includes guide tracks which cooperate with mating structures on said at least one yoke so as to vary the position of the yoke within the box enclosure.

8. The electrical box of claim 7 wherein at least one of the mating structures include a slot for receiving a screw, wherein the screw penetrates the box enclosure so as to secure the at least one yoke to the box enclosure.

9. The electrical box of claim 7 wherein the box enclosure is a multiple-gang box for receiving a number of yokes, wherein the collar includes an equal number of collar apertures which receive an equal number of covers having cord doors.

10. The electrical box of claim 7 further comprising:
a collar connected to the box enclosure for providing an interface between the box enclosure and the mounting surface, wherein the collar includes a plurality of interior side walls which define at least one collar aperture for admitting access to the electrical device;
at least one cover, hingeably connected to the collar, for optionally covering the electrical device, wherein the cover substantially resides within the at least one collar aperture, and wherein the cover includes a cord door aperture;
at least one cord door, hingeably connected to the cover, for optionally admitting an electrical cable in electrical connection with the electrical device, wherein the cord door substantially resides within the cord door aperture.

11. The electrical box of claim 10 further comprising a cord door gasket for substantially providing a fluid seal between the cover and the cord door, and a collar gasket which resides within the at least one collar aperture for providing a fluid seal between the collar and the cover, wherein one of said plurality of interior side walls of the collar includes a ramped portion which extends toward the at least one cord door, wherein the collar gasket includes an extending portion which mates with the ramped portion to seal against the cord door, wherein the collar gasket and cord door gasket cooperate to provide a substantially fluid-tight seal around the cover and the cord door.

12. The electrical box of claim 10 wherein the cover is reversible, and has a finished surface and a recessed surface for receiving carpet and tile.

13. The electrical box of claim 10 wherein the cover and cord door are respectively hingeably connected with a plurality of projections which cooperate with dimples, one of said plurality of projections and dimples being formed on one of said cover and cord door and the respective other of said plurality of projections and dimples being formed on the respective other of said cover and cord door, to permit reversible installation of the cover and the cord door.

14. The electrical box of claim 10 wherein the collar includes a removable carpet flange having a tapered edge for cooperating with a carpeted surface, wherein upon removal of the carpet flange, the collar presents a flat edge which cooperates with abutting edges of tile.

15. The electrical box of claim 7 wherein the box enclosure comprises a base and sides that are discrete components having cooperating interlocking structures and wherein a plurality of bases and sides can be assembled to form a multiple-gang box.

16. An electrical box for retaining an electrical device, said box comprising:
a box enclosure including at least one yoke for receiving the electrical device, wherein the box enclosure is retained on a mounting surface;
a collar connected to the box enclosure for providing an interface between the box enclosure and the mounting surface, wherein the collar includes a plurality of interior side walls which define at least one collar aperture for admitting access to the electrical device;
at least one cover, hingeably connected to the collar, for optionally covering the electrical device, wherein the cover substantially resides within the at least one collar aperture, and wherein the cover includes a cord door aperture, wherein the cover is reversible, and has a finished surface and a recessed surface for receiving carpet and tile;
at least one cord door, hingeably connected to the cover, for optionally admitting an electrical cable in electrical connection with the electrical device, wherein the cord door substantially resides within the cord door aperture.

17. The electrical box of claim 16 further comprising a cord door gasket for substantially providing a fluid seal between the cover and the cord door, and a collar gasket which resides within the at least one collar aperture for providing a fluid seal between the collar and the cover, wherein one of said plurality of interior side walls of the collar includes a ramped portion which extends toward the cord door, wherein the collar gasket includes an extending portion which mates with the ramped portion to seal against the cord door, wherein the collar gasket and cord door gasket cooperate to provide a substantially fluid-tight seal around the cover and the cord door.

18. The electrical box of claim 16 wherein the cover and cord door are respectively hingeably connected with a plurality of projections which cooperate with dimples, one of said plurality of projections and dimples being formed on one of said cover and cord door and the respective other of said plurality of projections and dimples being formed on the respective other of said cover and cord door, to permit reversible installation of the cover and the cord door.

19. The electrical box of claim 16 wherein the collar includes a removable carpet flange having a tapered edge for cooperating with a carpeted surface, wherein upon removal of the carpet flange, the collar presents a flat edge which cooperates with abutting edges of tile.

20. The electrical box of claim 16 wherein the box enclosure is a multiple-gang box for receiving a number of yokes, wherein the collar includes an equal number of collar apertures which receive an equal number of covers having cord doors.

21. The electrical box of claim 16 wherein the box enclosure includes a base and sides that are discrete components having cooperating interlocking structures and wherein a plurality of bases and sides can be assembled to form a multiple-gang box.

22. The electrical box of claim 16 wherein the box enclosure includes guides which cooperate with mating structures on the at least one yoke so as to vary the position of the at least one yoke within the box enclosure.

23. The electrical box of claim 22 wherein at least one of the mating structures include a slot for receiving a screw, wherein each screw penetrates the box enclosure so as to secure the yoke to the box enclosure.

* * * * *